United States Patent Office 3,365,689
Patented Jan. 23, 1968

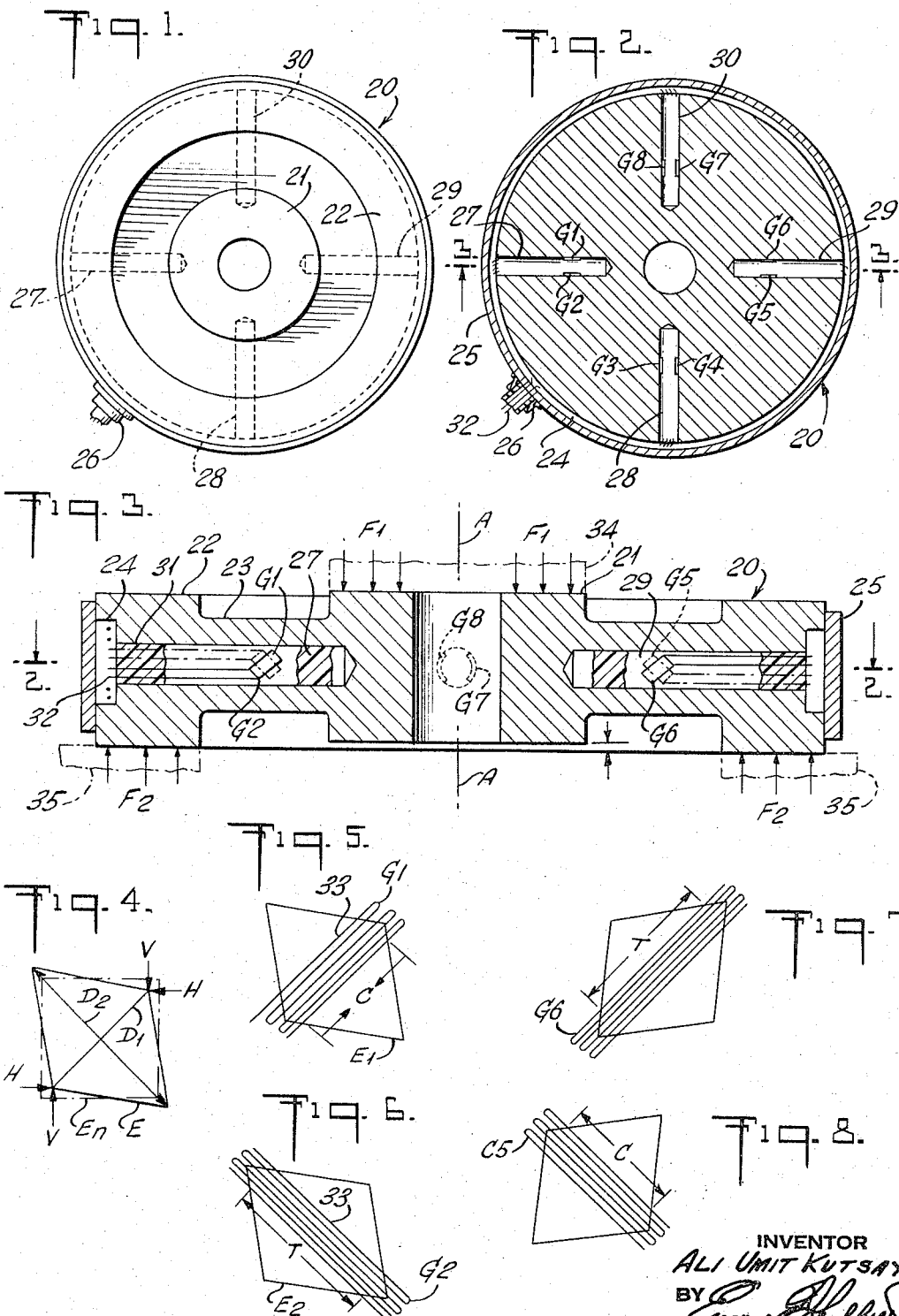

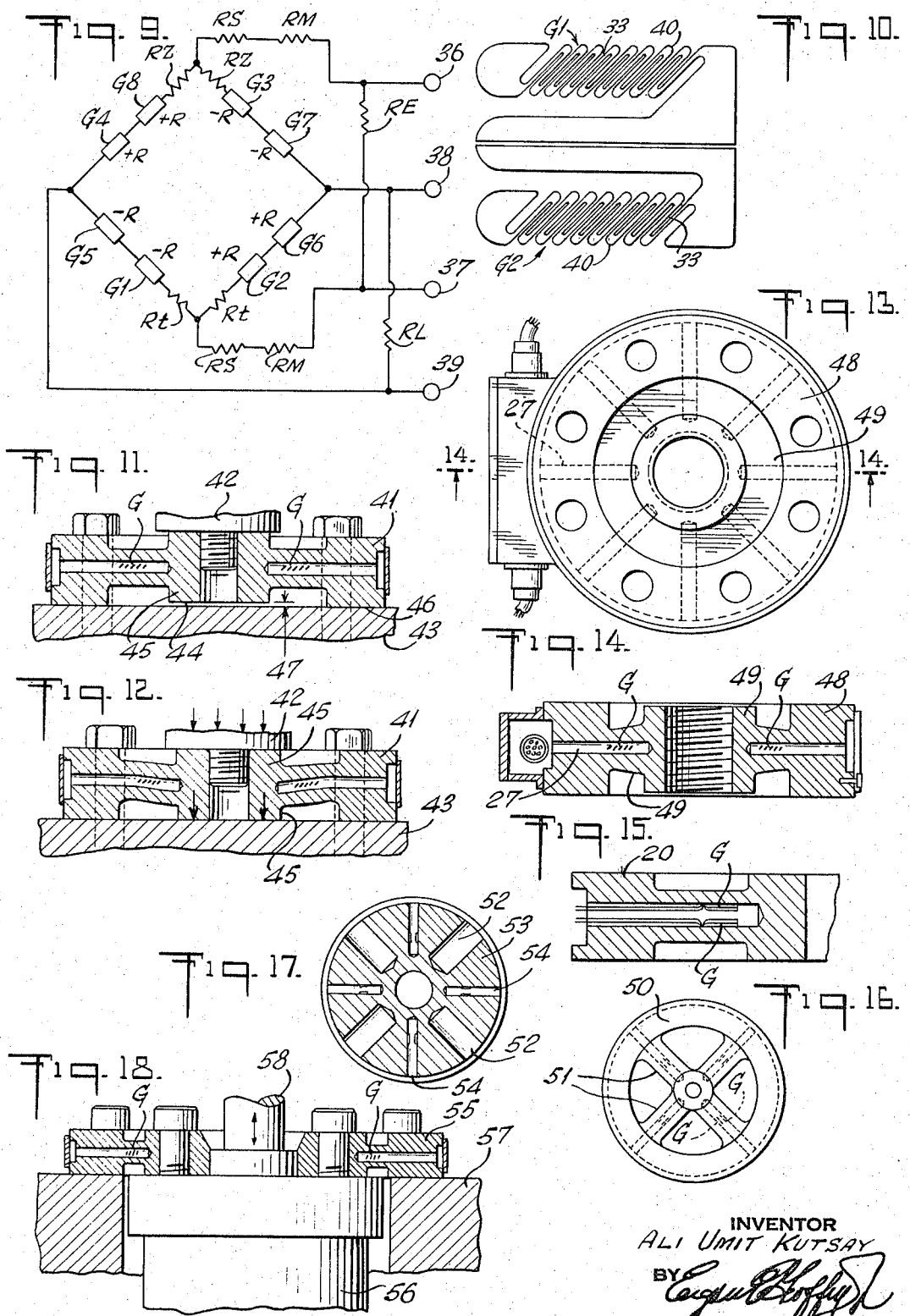

3,365,689
STRAIN GAGE APPARATUS
Ali Umit Kutsay, 3520 Lewis Road, Newtown Square, Pa. 19073
Filed Apr. 26, 1966, Ser. No. 545,420
10 Claims. (Cl. 338—5)

ABSTRACT OF THE DISCLOSURE

A strain gage load cell wherein the load cell is in the form of a disc having radially formed holes therein and strain gages mounted on the shear strain zones of the holes in mutually crisscross axial relationship when the disc is in the horizontal plane to detect shear stresses when opposing forces are applied to the center of one side of the disc and to the periphery of the other side of the disc, said disc having a peripheral groove in intersecting relationship with the radially formed holes whereby a sealing means for the strain gages is provided.

---

This invention relates to improvements in strain gaging apparatus. In the art of measuring forces by means of gages having electrical resistances varying in well-known manner under strain, an important field involves the use of devices known as load cells, in which such gages are incorporated. The force to be measured in each case is applied to the cell structure, producing strain or distortion therein. The strain is sensed by the gages and the output may be measured by conventional means such as a Wheatstone bridge circuit and suitable instruments, and thus, assuming proper calibration, be made to produce an indication of the applied force.

Heretofore, load cells have had many limitations which seriously limited their use. For example, it often became necessary to measure the force transmitted from one member in a machine or structure to an adjoining member, and prior load cells were not readily adapted for such applications. Conventional load cells are relatively large and long, and therefore could not be utilized without interference with the functional parts of the structure or machine in which the forces were to be measured. Hence, if such cells were to be employed to measure forces in the system, the system itself must be altered, usually with sacrifice of compactness and rigidity. Further difficulties with conventional cells include complication, harmful sensitivity to extraneous forces and vibration as in propulsion devices and when operated in pressure or vacuum environments.

In view of the above, one object of the present invention is to provide an improved load cell of maximum compactness, ruggedness, ease of application, and imperviousness of extraneous conditions.

Another object is to provide a strain measuring load cell including a substantially flat body member in which are embedded suitable gaging means adapted to detect strains within the body member.

A further object is to provide a strain measuring load cell in which a plurality of straing age elements are orientated within openings formed in the body in a manner that will produce a cumulative output of maximum value with minimum space requirement.

A further object is to provide a load cell wherein both the compressive and tensional components of shear strain within the stressed cell body may be utilized to increase substantially the output signal from a strain gage Wheatstone bridge circuit.

A further object is to provide a load cell in which the possible strain of the stressed body member is automatically limited to the predetermined accurate and structurally safe gaging range of the cell, i.e., inherent overload protection.

Another object is to provide a load cell having inherently high natural frequency and hence relative insensitivity to vibration.

A still further object is to provide a basic cell structure which is readily adaptable for incorporation in apparatus.

Another object is to provide a cell which affords automatic compensation for off-center or angular loading.

Still another object is to provide a load cell that is insensitive to changes in ambient pressure, so that it might be usable in evacuated or pressurized chambers and environments without recalibration or correction.

The above and other objects and advantages will become more apparent in the course of the following description and accompanying drawings forming part of this application.

In the drawings:

FIGURE 1 is a plan view of one embodiment of the invention.

FIGURE 2 is a diametral transverse section of the structure shown in FIGURE 1 and taken along the line 2—2 of FIGURE 3.

FIGURE 3 is a cross sectional view of FIGURE 2 and taken along the like 3—3 thereof.

FIGURE 4 is a diagram illustrating the strain or distortion of an elemental area of a material under stress by shear.

FIGURES 5 and 6 are similar diagrams illustrating the sensing of the elemental distortion by two strain gages among a plurality arranged as illustrated in FIGURES 2 and 3.

FIGURES 7 and 8 are diagrams illustrating the sensing of strain by a second pair of cooperative gages such as the gages shown in FIGURES 2 and 3.

FIGURE 9 shows a typical bridge circuit for the sensing outputs of the plurality of gages in cooperative combination.

FIGURE 10 is an enlarged illustration in a flat plane of one form of gage configuration with two gages on a common backing. Upon installation, this pair of gages takes the cylindrical shape of the hole surface, and maintain a predetermined angular relation to each other.

FIGURES 11 and 12 are sectional views of a cell illustrating the feature of automatic overload protection.

FIGURE 13 is a plan view of a form of the device combining very high load capacity with maximum sensitivity.

FIGURE 14 is a vertical section of the same in the plane 14—14, FIGURE 13.

FIGURE 15 illustrates a portion of a load cell in which the strain gages are installed so as to sense bending of the stressed web of the load cell.

FIGURE 16 represents a plan view of a load cell which is adapted for measurement of light loads, by increasing the strain sensitivity of the gaged areas.

FIGURE 17 illustrates a further means for increasing the strain sensitivity of a given load cell.

FIGURE 18 illustrates one form of apparatus embodying a load cell in accordance with the invention.

Referring to FIGURES 1, 2, and 3, the numeral 20 denotes a body member of metal or other suitable material and of generally overall flat circular conformation including a hub portion 21, a rim portion 22, and an intermediate web portion 23. An exterior groove 24 may be enclosed by a sleeve 25, thus forming a circular conduit provided with a suitable outlet 26. A series of circumferentially spaced holes 27, 28, 29, and 30 lead radially inwardly through the web portion 23. Two matching electrical strain gages G-1 and G-2 are bonded to the diametrically opposite sides of the hole 27 within the web portion 23. These two gages are arranged in mutually crisscross relation with their sensing directions at respective sensing angles of forty-five degrees with the axial line A of the body member 20 as indicated in FIGURE 3. Similar pairs of gages G–3 and G–4, G–5 and G–6, and G–7 and G–8 are provided in the holes 28, 29, and 30 as shown in FIGURE 2. While for simplicity in explanation four holes and corresponding gage pairs are shown, any suitable number may be employed as hereinafter set forth. The gages are secured and are preferably hermetically sealed within the holes by any suitable means such as those disclosed in United States Patent No. 2,873,341. The numeral 31, FIGURE 3, denotes a portion of such a closure and sealing means, the inner part thereof being cut away to permit clear illustration of the gage positions. The conductors 32 from the various gages extend outwardly to the peripheral conduit 24 whence they are led out through the fitting 26. If desired, the assembled conductors in the conduit 24 may be fixed and hermetically sealed therein, for example by means of a suitable sealing compound, and the outlet 26 may also be hermetically sealed.

The gages G–1 and G–2, etc., may be of well-known continuous grid types having a plurality of closely disposed parallel sensing legs 33, the latter being diagrammatically illustrated in enlarged form in FIGURE 5.

In a typical installation (see FIGURE 3), a downward force $F_1$ applied by part 34 to the hub 21 is resisted by an equal upward force $F_2$ supplied by a supporting part 35. Application of these parallel but non-aligned opposing forces produces shearing stress and consequent strain in the web 23. The geometrical aspect of such shear strain is illustrated in FIGURE 4, in which $E_n$ represents a normally square small element of a lateral surface of the hole 27 to which the gage G–1 is attached. When parallel opposing vertical forces V are applied to opposite corners of the square $E_n$, they induce horizontal forces H at the same corners, and the resultants of the two pairs of forces distort the square into the form of a rhombus E without significantly changing the lengths of the sides so that one diagonal $D_1$ is contracted while the other $D_2$ is expanded. Referring now to FIGURE 5, in which the surface portion $E_1$ may be considered as a developed composite of the small elements E, it will be observed that if the gage G–1 has initially been bonded to the surface portion $E_1$ while the latter was in unstrained condition, i.e., when its aspect was that of a square with the active gage filaments 33 arranged diagonally thereon, strain distortion of $E_1$ to the generally rhombic shape compresses the filaments longitudinally as indicated by the letter C, thus reducing their electrical resistance.

In a similar manner (see FIGURE 6), a surface portion $E_2$ carries the gage G–2 with its active filaments 33 arranged at right angles to those of gage G–1, that is, in the direction of diagonal $D_2$ in FIGURE 4. In this instance the rhombic distortion of $E_2$ stretches the filaments 33 under tension T, thus increasing their electrical resistance. Thus gages G–1 and G–2 installed in one given hole, are adapted to measure the distortion due to shear of an element of the load cell of FIGURE 3.

The effects of the shear strain upon the gages G–6 and G–5, as indicated in diagrammatic FIGURES 7 and 8 respectively, occur in the same manner as described above, and the same action occurs with the other pairs of gages G–3 and G–4, and G–7 and G–8, all of which are shown in FIGURE 2. The composite effect of resistance changes in all the gages of the system may be derived by connecting them in a typical Wheatstone bridge circuit as illustrated in FIGURE 9 in which numerals 36 and 37 indicate input or excitation supply terminals and 38 and 39 output or signal terminals. For maximum accuracy and to comply with accepted standards, the circuits include special resistance elements such as temperature compensation resistors RT, zero load bridge balance trim resistors RZ, output signal adjusting resistors RS, elastic modulus compensation resistor RM, excitation resistance trim resistor RE, and signal resistance trim resistor RL. When the cell 20 is strained by the unknown force $F_1$ in the example described above, gage resistances decrease and increase, indicated by $-R$ and $+R$ respectively and cooperate to unbalance the bridge circuit, allowing the output signal from the terminals 38 and 39 to be measured in the usual manner to provide the desired indication of the load applied to the cell. The output signal therefore represents cumulative sensing by all of the gages contained in the body member 20. Furthermore, the holes in which the gages are mounted extend across the stress or strain pattern, producing a concentration of stress adjacent to the holes substantially greater than the stress level were the holes not formed. This concentration does not occur with holes or openings formed along or parallel to shear stresses. In addition, there is a minimum of bending stress at the gage locations of load cell shown in FIGURE 3, since the gages are at the neutral bending plane and inflection point of web 23. These factors permit the cell to be of maximum compactness and ruggedness and at the same time afford a relatively high sensitivity.

The pairs of strain gages in a given hole such as pair G1 and G2, pair G3 and G4, etc., may consist of two separate, individual rectangular type gages, properly oriented at 45 degrees relative to axis A of load cell. In practice, however, it may be advantageous to use a pair of gages on one thin backing or carrier, and properly oriented and spaced relative to one another as shown in FIGURE 10, so that upon being properly bonded to the cylindrical wall of the drilled hole, 27 to 30 inclusive, the two gages forming one pair will end up along the neutral axis, i.e., the region of maximum shear, and in the correct orientation of 45 degrees for maximum strain sensitivity. Gage elements 33 which are shown parallel before installation, will be 90 degrees relative to each other after the gages are bonded at the diametrically opposite sides of the cylindrical hole. The strain sensitive grids 33 of FIGURE 10 may be formed of continuous wire or by the etching method in which latter case the short portions 40 connecting the filaments may be made with relatively large cross sectional area and hence negligible resistance.

FIGURES 11 and 12 illustrates the means by which the cell in accordance with the invention may be made automatically self-protecting against overstrain in case of temporary or accidental overload. In FIGURE 11 the cell body 41 is secured to an upper member 42 and a flat lower member 43 for measurement of compressive forces between them. The body 41 is so formed that when the device is unstressed the lower face 44 of the hub 45 is displaced upward from the lower face plane of the rim 46 by a distance 47 (exaggerated for clarity in illustration) corresponding to the normal working flexure range of the cell, i.e., within which range accurate response by the gages G is maintained. In case of overload, due to shock for instance, the hub 45 encounters the member 43 as shown in FIGURE 12, preventing any further flexure. In this manner the formation of the body 41 itself in such installations intrinsically protects both the gages G and cell structure against overstrain and resulting subsequent false registry and damage without recourse to shims and exterior stops. In the example (FIGURES 11 and 12) protection against a downward overload by member 42 (in direction of arrows) is illustrated. Protection against overload in opposite direction can also be provided in similar fashion by the addition of a suitable plate overlying the transducer and engaging the hub 45. In this case the overlying plate would have a central opening to accommodate the member 42 having a diameter smaller than the diameter of the hub.

FIGURE 13 and 14 illustrate the fact, previously mentioned, that the number of radial holes and contained gage pairs is not confined to the four taken for simplicity in the foregoing explanation, but may be any larger suitable number permitted by the size of the desired cell and the desired mode of operation. In FIGURE 13 the body 48 has eight such holes 27, etc., each equipped with a pair of gages G as previously set forth, allowing, for instance, the installation of two independent bridge circuits in the small cell. If two gages are installed in each hole, as previously, but only one gage is used in each leg of the Wheatstone bridge, then four independent bridge circuits in the same cell are possible.

An additional advantage inherent in the essentially flat rugged cells described lies in their high natural frequencies which render them impervious to extraneous vibrational disturbances such as those encountered in the rocket engine firing previously mentioned, as well as their ready adaptability to measurement of repeated reversing dynamic forces nad shifting weights characteristic of various modern systems. Still another very important advantage of the flat load cell is for measurement of forces when the equipment is contained inside pressure or vacuum chambers. Such chambers are widely in use in research or test laboratories. Referring to FIGURE 3, any change of external pressure around the flat load cell will cause some uniform overall change in external dimension of the cell, but it will cause no distortion or shear of the sensing zones. Thus, all, gages G1 to G8 inclusive will be equally affected, and because of their symmetrical in the bridge circuit of FIGURE 9, the net result of the pressure change will be zero signal between output terminals 38 and 39. Furthermore, a pressure change of the order of magnitude of one atmosphere, or 14.7 p.s.i. would only cause a very insignificant change in each gage, as compared to the strains imposed by the unknown loads to be measured. This characteristic is not found in the common, presently conventional column type load cells which have a relatively large cylindrical compartment sealed at one end with a diaphragm. In these conventional load cells the change of pressure acts over the area of the diaphragm, and induces a force on the gaged column which is attached to the center of the diaphragm. Thus, these load cells will sense both external forces and changes in the ambient pressure, and special corrections are needed to cancel the pressure effect, when these must be used inside pressure or vacuum chambers.

FIGURE 15 illustrates an alternative gage arrangement within the body member 20. In this case, gages G are bonded to the top and bottom walls of holes 27, etc., with their sensing directions pointing radially towards the center of the cell, that is, parallel to the axis of hole, and at right angle to the axis A of the cell, instead of the 45 degree angle employed for measuring shear. In this case, the gages are again located diametrically opposite to each other within each hole, and are wired to adjacent legs of the Wheatstone bridge circuit, which thus senses the bending of the web of the load cell. There are instances where such a gaging arrangement, may be preferable to the gaging arrangement of FIGURE 3.

FIGURE 16 illustrates a type particularly adapted to measurement of light loads, the web portion of the body member 50 being cut away to form spokes 51 in which the gages G are embedded in the manner described. FIGURE 17 shows a further method of concentrating the shear stress at the gage stations by means of relatively large radial holes 52 in the body 53 intermediate the gage holes 54. This provision may typically be used in simple cell forms of uniform thickness throughout, that is, wherein the shear zone is not reduced in thickness.

FIGURE 18 illustrates the versatility of the invention in ready adaptability to built-in applications, the cell body 55 being employed as a mounting plate securing a double-acting hydraulic cylinder 56 to a support 57. In operation, the various gages G in the cell body 55 cooperate in the manner previously explained to measure the alternating compressional and tensile forces applied by the piston rod 58. It will be noted that the cell performing this added function occupies little if any more space than would be required for an ordinary mounting plate, thus accentuating the extreme compactness characteristic of the invention in all its forms. Clearly, similar adaptations can readily be made to a variety of other special applications, such as, thrust bearing housings and the like.

From the foregoing description it is apparent that through the use of radially disposed gage receiving openings, the cell can be made highly compact and rugged and the intermediate web portion can be modified to produce a wide variety of modes of operation.

While the cell embodiments have been shown herein as circular in periphery, for special requirements other outer shapes such as square, octagonal, etc., may be employed with no change in essential inner construction or operation. Thus, while the device has been set forth in preferred form, it is not limited to the precise structures illustrated, as obviously various modifications may be made without departing from the spirit of the invention within the scope of the appended claims.

What is claimed is:

1. In a load cell, in combination, an essentially flat body member including concentric inner and outer pressure zone portions and an intermediate strain zone portion adapted to undergo strain in response to a pair of opposing forces applied respectively to said pressure zone portions, said member having a plurality of recesses extending radially inwardly and generally centrally within the interior of said strain zone portion in circumferentially spaced relation about the axial line of said inner pressure zone portion, and a plurality of electrical strain gages disposed in said recesses in intimate strain responsive relation with the shear strain zones of said strain zone portion and with their sensing directional lines disposed at predetermined angles with said axial line, said shear strain zones of said recesses being the sides of said recesses when said axis is in a vertical position.

2. A load cell according to claim 1 wherein said strain gages are arranged with said angular sensing directional lines of adjacent gages disposed in mutually crisscross axial relationship, whereby said adjacent gages may sense directionally differing components of shear strain imposed thereon by said applied forces.

3. A load cell according to claim 1 wherein said strain gages are arranged with said sensing directional lines of adjacent gages in mutually crisscross relationship, and wherein each of said predetermined angles of said sensing directional lines with said axial line is substantially forty-five degrees, whereby said adjacent gages may sense mutually perpendicular components of shear strain imposed on said strain zone portion by said opposing forces.

4. A load cell according to claim 1 wherein said recesses comprise holes originating at a peripheral surface of said body member and directed radially inward within the mass of said strain zone portion.

5. A load cell according to claim 1 wherein said body member has a peripheral groove, wherein said recesses comprise holes directed radially inward from the bottom peripheral surface of said groove within the mass of said strain zone portion, and wherein said load cell further includes means to seal said gages in said holes, said gages having terminal conductors leading outward through said sealing means to said groove.

6. A load cell according to claim 5 including closure means for said groove and forming therewith a peripheral conduit for said conductors, and outlet means on said closure means for establishing outside electrical connections for said conductors contained in said conduit.

7. A load cell according to claim 1 wherein said inner pressure zone portion, said outer pressure zone portion, and said strain zone portion are formed respectively as a hub, a rim, and a web of reduced thickness, and wherein said gages enclosed in said web are located substantially midway of the radial extent of said web.

8. A load cell according to claim 1 wherein regions of said strain zone portion circumferentially intermediate said recesses are of reduced material content, whereby said strain may be concentrated in the regions of said recesses.

9. A load cell according to claim 1 wherein said strain zone portion comprises a web tapering in thickness in substantially inverse ratio to the radial extent thereof, whereby shear strain for detection by said gages may be of substantially constant magnitude throughout said radial extent.

10. A load cell according to claim 1 wherein two strain gages are disposed within each of said recesses with each pair of said gages having common mounting means precisely positioning them along mutually perpendicular axis within said recesses.

References Cited

UNITED STATES PATENTS

| | | | |
|---|---|---|---|
| 2,597,751 | 5/1952 | Ruge. | |
| 2,855,489 | 10/1958 | Ruge | 338—6 |
| 3,035,240 | 5/1962 | Starr. | |
| 3,037,178 | 5/1962 | Pien | 338—5 |
| 3,195,353 | 7/1965 | Pien | 338—4 |
| 3,196,676 | 7/1965 | Pien | 338—4 |

RICHARD M. WOOD, *Primary Examiner.*

W. D. BROOKS, *Assistant Examiner.*